May 3, 1927.
F. GILDAY ET AL
1,627,380
AUTOMATIC SIGNAL SYSTEM
Filed Dec. 6, 1924
2 Sheets-Sheet 1
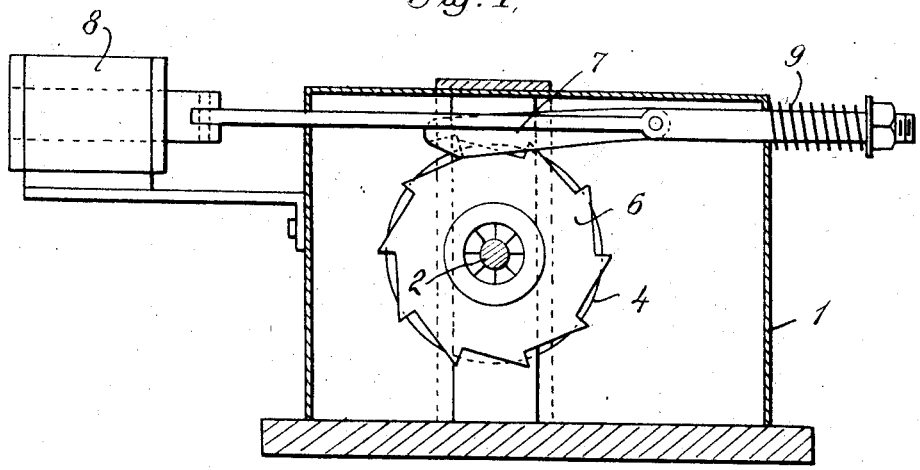
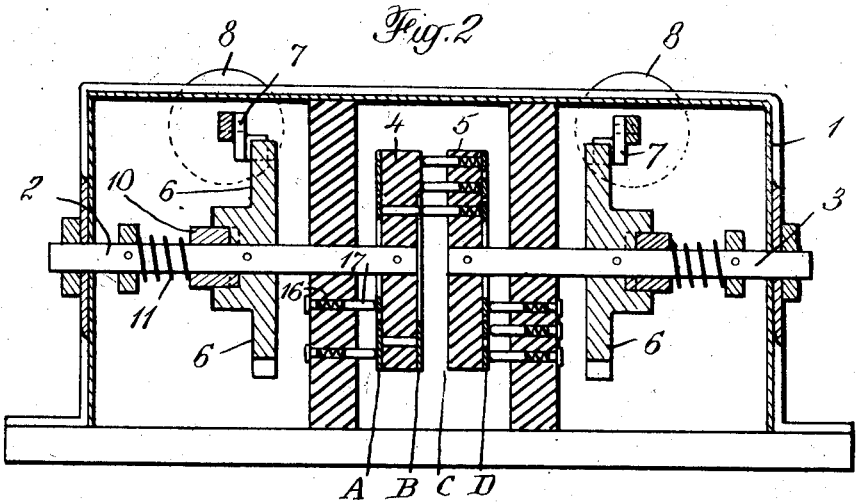
INVENTOR
Frank Gilday
William J. Duffy
BY
Pennie Davis Marvin & Edmonds
ATTORNEY May 3, 1927.
F. GILDAY ET AL
1,627,380
AUTOMATIC SIGNAL SYSTEM
Filed Dec. 6, 1924 2 Sheets-Sheet 2
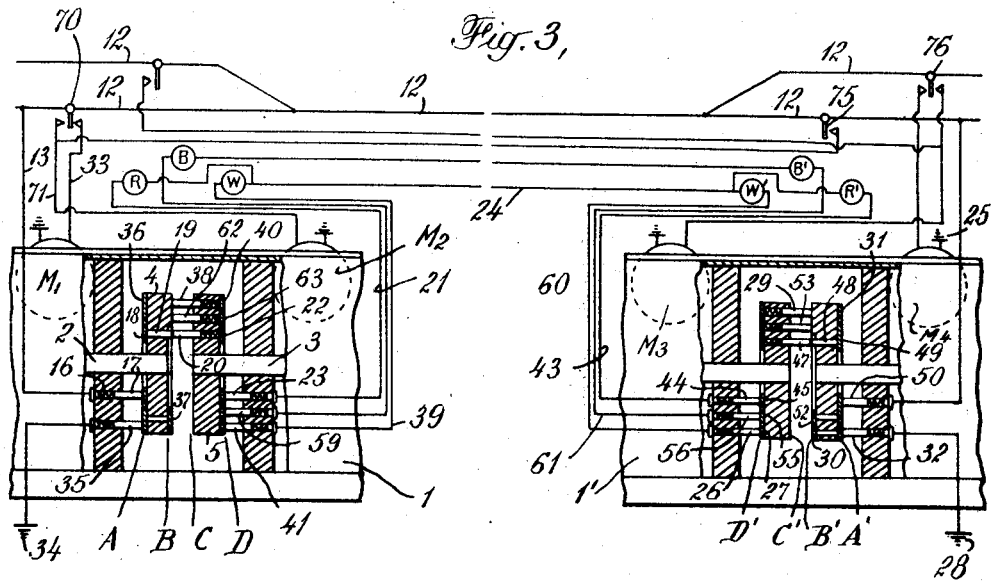
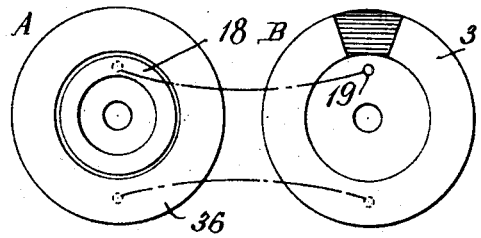
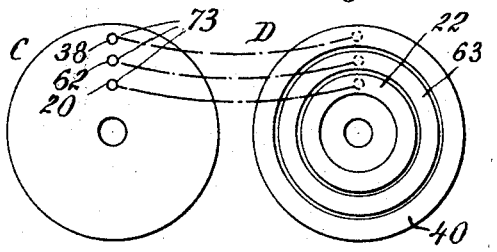
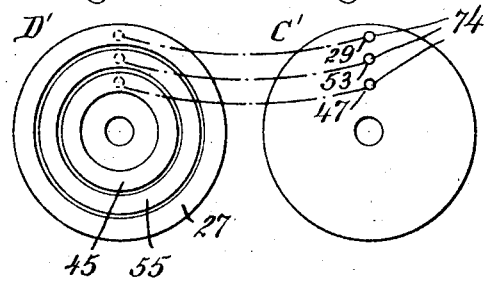
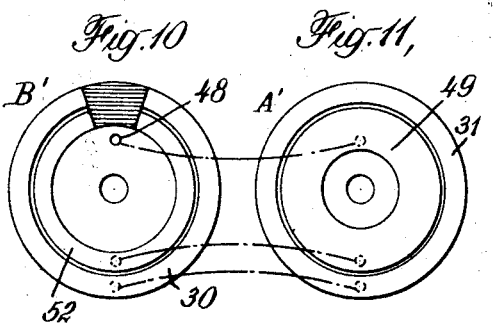
INVENTOR
Frank Gilday
William J. Duffy
BY
Pennie Davis Marvin & Edmonds
ATTORNEY Patented May 3, 1927.

1,627,380

UNITED STATES PATENT OFFICE.

FRANK GILDAY AND WILLIAM J. DUFFY, OF MAYFIELD, PENNSYLVANIA.

AUTOMATIC SIGNAL SYSTEM.

Application filed December 6, 1924. Serial No. 754,267.

The present invention relates to an electric block signaling system and has to do particularly with the control of cars or trains operating in both directions over single track sections.

In single track railways or car lines the route is normally divided into appropriate lengths or sections of single track connected by short double track sections or sidings, at which sidings oppositely bound cars may pass. The double track sidings are commonly some little distance apart and, for safe operation, it is necessary for the operator of a car to know at the time he enters upon a single track section that there is not an oppositely directed car approaching over the same section. On lines carrying any considerable amount of traffic it is ordinarily not feasible to operate on schedule or orders alone, and for this reason various types of signaling systems for indicating the traffic conditions ahead have been proposed. Certain of these systems involve manually actuated devices operated by the motorman of a car at the time he enters a single track section. Others are automatically actuated and in general serve to indicate to the operator of a car entering a single track section whether the track is clear to the next siding. These systems are open to the objection that while they may direct traffic satisfactorily under normal conditions, they fail in certain exceptional instances and thus are not thoroughly dependable under all circumstances which may arise.

It is a principal object of this invention to provide an automatically operated signal system for single track sections by means of which the traffic conditions in the section ahead are accurately indicated to the operator of the car entering that section under any conditions which may arise. The invention intends particularly to avoid the possibility of two oppositely moving cars passing into a single track section without either of the operators of the cars having knowledge of the situation.

The invention contemplates a signaling system wherein a signal box containing suitable signal lights is placed at each end of the single track section. Each signal box contains three lights of different colors, for instance, white, red and blue. The white light and the red light at the respective signal boxes serve to control the traffic in both directions under normal conditions, while the blue light serves as an emergency light to indicate exceptional conditions which may arise along the track section. When there is no car present in the single track section the lights at each end of the section are extinguished. Upon entrance of a car into the section from one end the white light at that end is energized while at the opposite end of the section the red light is energized. Upon passage of the car out of the section at the other end both lights are extinguished. If, however, two cars enter the track section at its respective ends simultaneously, the blue light in each of the two boxes is actuated so that the operator of each car is aware of the condition which exists. The same is true if one car enters the section at the time an oppositely directed car is in that section. Upon entrance of the second car into the section, the blue light at that end of the section will be actuated, and the operation of the car may be conducted accordingly. So also if the red light at one end of the section may for instance be burned out, entrance of a car into the section at that end serves to actuate the blue light, whereupon the car may be held until the oppositely moving car has passed over the single track section.

It is a further object of the invention to provide a signal system having the advantages above enumerated, yet which is extremely simple and practical from the standpoints of manufacture, installation and operation. The actuating mechanism for each signal box requires two solenoids. Currents are handled by carbon brushes operating on suitable contacts with the result that the portions of the apparatus which make and break the electric currents are subject to practically no deterioration and are capable of giving long service without replacement or repair. The mechanism is compact and simple mechanically and is therefore of low manufacturing cost.

It is also an object to provide a signal system of this type which requires no resetting at any time and which is capable of handling a large number of cars passing in one direction along a single track section without rendering the system inoperative.

A preferred embodiment of the invention is illustrated in the accompanying drawings wherein Figure 1 is a transverse sectional view showing the actuating mechanism for the signal lights; Figure 2 is a sectional view of the apparatus taken at right angles to the view shown in Figure 1; Figure 3 is a diagrammatic view showing a single track section together with the various apparatus and connections constituting the signaling system for that section; and Figures 4 to 11 inclusive are views showing the various contact discs which control the actuation of the signal lights.

The actuating apparatus for signal lights consists, as shown in Figures 1 and 2, of a suitable housing 1 in which are mounted two actuating shafts 2 and 3. The shaft 2 carries at its inner end a contact block 4 on one face of which is mounted a set of contacts as indicated at A and on the other face is mounted a second set of contacts B. Shaft 3 is provided with a contact block 5 carrying on one face a set of contacts C and on the other face a second set of contacts D. Each of the shafts carries a ratchet wheel 6 actuated by means of a co-operating member 7 which is periodically reciprocated through the medium of the solenoid 8. Actuation of solenoid 8 pulls the member 7 to the left, as viewed in Figure 1, against the compression of spring 9. This causes the member 7 to engage with the next succeeding tooth of the ratchet wheel 6 and, upon de-energizing of the solenoid, the spring 9 will return actuating member 7 to its former position with the result that ratchet wheel 6, together with shaft 2, is rotated an amount corresponding to the arc occupied by one of the ratchet teeth. A tooth clutch member 10, pressed against ratchet wheel 6 by means of a spring 11, serves to prevent rotation of the ratchet wheel in the wrong direction and at the same time insures movement of the ratchet wheel by the proper amount at each actuation of the solenoid 8. The shaft 3 is provided with a similar solenoid operated mechanism for the purpose of imparting to it the desired character of rotation.

The complete signaling system required for one section of single track is shown diagrammatically in Figure 3. The trolley wire or equivalent electrical conductor constituting the high potential side of the electric circuit from which the cars are operated is indicated at 12. The drawing represents the entire length of a single track section, together with a double track siding at each end of the length of single track. The term single track section, as used in this application, refers of course, to the entire length of single track, together with so much of the double track at each end of the single track section as is necessary to the operation of the signal system. The respective signal boxes at the opposite ends of the single track section are indicated generally at 1 and 1'. The signal lights associated with the respective boxes are designated by the letters R, B and W, and R', B' and W', the colors of the respective lights being for the purposes of this application considered as red, blue and white.

When there is no car within the entire track section, all of the signal lights are extinguished. A main lead or feeder 13 passes from the trolley wire 12 into the signal box 1 from whence it is connected to the carbon brush 17, which bears against certain of the contacts A which are carried by the shaft 2. The carbon brush 17 is held in operative engagement with the contacts A through the pressure of the spring 16, which also serves to carry the electric current from the lead 13 to the brush 17. The arrangement of the contacts A is shown in Figure 4. Brush 17 contacts with the conducting band 18, which band is connected with a copper conductor extending through contact block 4 and appearing as indicated at 19 on the face of contact disc B, illustrated in Figure 5. With the position of the discs as shown contact 19 is in engagement with brush 20, which is electrically connected to the contact band 22 which constitutes one of the contacts D illustrated in Figure 7. Brush 23 is also in contact with the band 22 and serves to convey current to the lead 21, through the red light R of signal box 1 and from thence through lead 24 to the signal box 1' at the opposite end of the track section. From lead 24 current may pass through the red light R' through lead 43 and through brush 44 onto contact band 45, which constitutes one of the group of contacts D'. The spring 46 of contact brush 47 is in electrical connection with the contact band 45 with the result that current will be conducted through brush 47 to the contact 48 which extends through to contact disc A' and terminates in contact band 49, which is one of the contacts of the group A'. This contact band 49 is in contact with brush 50 from whence the lead or feeder 12 returns directly to the trolley wire 12.

Thus, in the normal condition when there is no car operating along the single track section, both ends of the circuit just traced will be at the same potential, namely that of the trolley wire, with the result that none of the signal lights are actuated.

The various sets of relatively rotatable contacts are illustrated in detail in Figures 4 to 11 and the electrical connections between certain of the contacts of the different sets are indicated. Contact bands 36 to 37 of discs A and B respectively are permanently interconnected as indicated in Figures 4 and 5. Similarly contact band 18 of disc A is connected through to contact point 19 of disc B. The three contact bands of disc D connect with brushes which pass through the three corresponding holes in discs C indicated generally at 73. Similarly the three contact bands of disc D' are connected by carbon brushes which pass through the three holes in the disc C' indicated generally at 74. Contact band 49 of disc A' is connected through to band 52 of disc B' and also to contact 48 of disc B'. Contact band 31 of disc A' is also connected to band 30 of disc B.

When a trolley enters the single track section from the left as viewed in Figure 1, it closes switch 70 thus permitting current to pass through lead 33 to the solenoid or magnet M' and from thence to ground as indicated. The switch 70 may be any of the well known types of switches operated by the wheel or other part of the car as it passes along the track. The closing of switch 70 by the passing car actuates the magnet M' with the result that the ratchet wheel 7, together with the sets of contacts A and B which are carried by it, is given a rotation through an arc corresponding to one of the ratchet teeth. This results in a corresponding relative displacement of the contact block 4 carrying contact sets A and B and the contact block 5, which latter contact block carries the sets of contacts C and D. This movement of the contact discs results in breaking the contact between the brush 20 and the contact pin 19, which is one of the contacts B, and establishes a contact between brush 38 and the band contact 37. Band contact 37 of contact set B is in electrical connection with band contact 36 of contact set A. Hence the connection is established to band 36 and from thence through brush 35 to ground in the fashion indicated at 34. The connection thus established lights the white light W in signal box 1 and the red light R' in signal box 2. The circuit extends from the ground 34 through brush 35, contacts 36 and 37, to brush 38 in the fashion just described, and continues to contact band 40 of the set D by reason of the direct connection of brush 38 to this band. Current is collected from the band 40 by brush 41, which is in connection with the lead 39 and is then passed to the white light W. The current then passes along the lead 24, traverses the red light R' and from thence through lead 43, brush 44, contact band 45, brush 47, contact 48, contact band 49, to the brush 50 and from thence through the feeder 12 back to the trolley line 12 after the fashion noted above in describing the connection which exists when the signal system is unenergized. This connection in signal box 1' remains the same as in the unenergized position because neither of the solenoids in the signal box 1' have been actuated.

As long as the car remains in the single track section the white light will remain energized at the initial end of the section and the red light will remain energized at the end of the section toward which the car is proceeding. As the car leaves the section and passes switch 75 the solenoid $M^2$ becomes energized with the result that the contact discs in the box 1 are restored to their initial position and all of the signal lights extinguished.

Similarly a car entering the section from the other end, that is, the end at which signal box 1' is located, closes switch 76 thus energizeing the solenoid $M^4$ and rotating contact discs A' and B'. The current passes from the ground connection 28 to brush 32, contact band 31 on disc A', contact band 30 on disc B', brush 29 to contact band 27 on disc D', to brush 26, from whence it traverses the lead 60 and ignites the white light W'. From thence the current traverses the red light R and then through lead 21 to brush 23, contact band 22, brush 20, contact 19, contact band 18, brush 17 and from thence through feeder 13 to the trolley wire. The connections in box 1 are the same as for the unenergized condition for the reason that neither of the solenoids in box 1 are actuated.

If two cars enter the single track section from different directions at the same time or if one car enters the section while an oppositely directed car is in that section, the blue emergency light will be energized. With this situation both solenoids $M^1$ and $M^4$ will have been energized through the closing of switches 70 and 76 with the result that both contact discs A and B and contact discs A' and B' will have been rotated a like amount in the same direction. With this situation current passes from feeder 12 to brush 50 in box 1' from thence to band contact 49 on disc A', to band contact 52 on disc B', from whence it is conducted off by brush 53 to band contact 55 on disc D' through brush 56 to lead 61 and from thence through the blue light B'. From thence the current passes to the other blue light B in box 1 at the other end of the track section. From this blue light B current passes through brush 59 to band contact 63 on disc D, through brush 62 to band 37 on disc B, through to band 36 on disc A, from thence through brush 35 to ground at 34. Thus when two oppositely directed cars enter the section the blue emergency lights at the respective ends of the section are energized.

When this situation occurs one of the cars may back up past his signal switch. For instance the car at signal box 1 may back up until he closes switch 70 which will energize lead 71 and solenoid $M^2$ with the result that contact discs C and D will be rotated and the circuit conditions rendered exactly the same as though car had not entered the track section while a car was approaching from the opposite direction. In other words, at that end of the section whether the car was backed out a red light will show, while at the other end a white light will show. If the cars entered the section simultaneously the changed lights resulting upon the backing out of one car will indicate that it is safe for the one viewing the white light to proceed. In any case the car which has backed out of the section will await the arrival of the other car and the operator will at all times be apprised of the actual situation existing.

The emergency lights in the present signal system are also effective in protecting against defects in the signal system. For instance if a car is traveling along the single track section and the red light which should show at the opposite end of the section is burned out, or for other reasons is inoperative, a second oppositely directed car will be apprised of the danger the moment it enters the section by reason of the fact that the blue emergency light will be energized. In the absence of a red light, the car naturally will proceed into the section whereupon the situation just described will arise, namely, there will be two oppositely directed cars within the section. The system will then function in the manner just described to ignite the blue emergency lights at the respective ends of the track section and these lights will continue to burn until one of the two cars passes out from the section.

The invention, therefore, contemplates a signal system of the class described which is simple in construction and operation and which guards against any emergencies which may arise through conditions of the traffic on the line or through defects in the normal traffic signal system itself. The system is applicable to the control of any vehicles confined to tracks, such as trains, street cars or the like and is designed for any system of trackage wherein cars are passed in both directions over a single track. The scope of the invention is defined in the appended claims.

We claim:

1. An electrical signal system comprising signaling means at one end of a track section for indicating the presence of a car in said section during normal operation of the system and emergency signaling means inoperative during normal traffic conditions for indicating exceptional traffic conditions within said track section.

2. An electrical signal system comprising signaling means at one end of a track section for indicating the presence of a car in said section during normal operation of the system and emergency signaling means inoperative during normal traffic conditions for indicating exceptional traffic conditions and also a defective condition of said signal system within said track section.

3. An electrical signaling system of the class described comprising means at one end of a track section for normally indicating the approach of a car along said section and additional signaling means for indicating the presence of two oppositely directed cars within said section.

4. A signal system of the class described for single track sections comprising signaling means associated with said track section for normally controlling traffic moving in both directions thereon and emergency signaling means for indicating the presence of oppositely directed cars within the track section.

5. A signal system of the class described comprising signaling means at one end of the track section for indicating the presence within said section of an approaching car and emergency signaling means actuated upon entry of an oppositely directed car into said section to thereby constitute a warning to the operator of said oppositely directed car.

6. A signal system for use on single track sections which comprises emergency signaling means actuated upon the simultaneous entry into the track section at the respective ends thereof of oppositely directed cars, the said emergency signaling means being visible from both cars.

7. A signal system of the class described comprising signaling means at the respective ends of a track section, each of said signaling means comprising three differently colored lights, means for maintaining all of said lights extinguished in the absence of a car within said track section, means actuated by the entry of a car into said track section for energizing a light of one color at the initial end of the track section and a light of another color at the remote end of said section and means for energizing a light of the third color upon the entry into said section of an oppositely directed car to thereby constitute a warning signal to said car.

8. A signal system of the class described for single track sections comprising lights of different colors, means for maintaining the lights extinguished when no car is present within said track section, means actuated by the entry of a car into said track section for energizing a warning signal at the remote end of said section and means for energizing an emergency signal upon entry into said section of an oppositely directed car, whereby a warning to said oppositely directed car is afforded.

9. A signal system of the class described comprising means actuated by a car entering a single track section for energizing a light of one color at the initial end of said track section and a light of another color at the remote end of said section, said energizing means comprising a plurality of rotatable contact bearing members and mechanism for rotating certain of said members a predetermined amount upon entry of said car into the track section, and means for returning the signal lights to normal condition upon passage of the car out of the track section which comprises mechanism for rotating the other contact bearing discs so that the said discs are returned to their initial relative position but are rotated bodily a predetermined distance out of their original position.

10. A visible signal system of the class described for controlling traffic on single track sections comprising a plurality of contact bearing elements at the respective ends of said track section for controlling the lighting of the various signal lamps, means actuated by the entrance of a car into the track section for moving certain of said contact bearing elements, a predetermined amount to thereby energize suitable signals at the respective ends of said track section and means actuated by the entry into said section of an oppositely directed car for moving certain of said contact bearing elements at that end of the single track section to thereby energize an emergency signal at that end of the section.

11. A signal system of the class described comprising a signal box at each end of the track section, each of said signal boxes containing suitable signal lights and a plurality of relatively rotatable contact bearing discs for controlling the operation of said lights, means actuated by the entry of a car into said section for rotating certain of said contact bearing discs at one end of the track section relative to the other of said contact bearing discs, the discs in the other of said signal boxes being normally not operated by the passage of said car through said track section, and means actuated by the entry into said track section of an oppositely directed car prior to the exit of said first car from the section for moving certain of the contact bearing discs at that end of the track section to thereby energize an emergency signal.

12. A signal system of the class described for controlling traffic on single track sections which comprises signal boxes at the respective ends of said track section each containing a plurality of signal lights and a plurality of relative movable contact bearing elements, means actuated by the entry of a car into said track section for moving the contact bearing elements in one of said signal boxes out of their initial relative positions to thereby energize suitable signal lights at the respective ends of said track section, means actuated by the entry of an oppositely directed car into the other end of said section for moving the contact bearing elements in the other of said signal boxes out of their initial relative positions to thereby energize appropriate emergency signals at the respective ends of said track section and means energiezd by the retirement of said oppositely directed car from said section for restoring the initial relative positions of the contact bearing elements associated with that end of the track section to thereby discontinue the emergency signals and restore the normal traffic signals.

In testimony whereof we affix our signatures.

WILLIAM J. DUFFY.
FRANK GILDAY.